(12) United States Patent
Kondo et al.

(10) Patent No.: US 8,475,250 B2
(45) Date of Patent: Jul. 2, 2013

(54) GAME DEVICE, METHOD FOR CONTROLLING GAME DEVICE, PROGRAM, AND INFORMATION STORAGE MEDIUM

(75) Inventors: Ippei Kondo, Tokyo (JP); Keiichiro Kurashige, Tokyo (JP); Shuji Yamamoto, Tokyo (JP); Atsushi Omura, Tokyo (JP); Naohiro Iizuka, Tokyo (JP)

(73) Assignee: Konami Digital Entertainment Co., Ltd., Tokyo (JP)

(*) Notice: Subject to any disclaimer, the term of this patent is extended or adjusted under 35 U.S.C. 154(b) by 83 days.

(21) Appl. No.: 13/054,588

(22) PCT Filed: Jun. 30, 2009

(86) PCT No.: PCT/JP2009/062004
§ 371 (c)(1),
(2), (4) Date: Jan. 18, 2011

(87) PCT Pub. No.: WO2010/007887
PCT Pub. Date: Jan. 21, 2010

(65) Prior Publication Data
US 2011/0124386 A1 May 26, 2011

(30) Foreign Application Priority Data
Jul. 16, 2008 (JP) .................. 2008-185435

(51) Int. Cl.
*A63F 13/00* (2006.01)
(52) U.S. Cl.
USPC ................................ 463/4; 463/36
(58) Field of Classification Search
USPC ................... 463/2–4, 23, 30–32, 36
See application file for complete search history.

(56) References Cited

U.S. PATENT DOCUMENTS 6,155,924 A * 12/2000 Nakagawa et al. ............... 463/4
6,280,323 B1 8/2001 Yamazaki et al.
7,300,345 B2 11/2007 Mifune et al.

FOREIGN PATENT DOCUMENTS

| CN | 1412689 A | 4/2003 |
|---|---|---|
| JP | 3057041 B2 | 8/1998 |
| JP | 2001-353358 A | 12/2001 |
| JP | 2007-215756 A | 8/2007 |
| JP | 2007-260157 A | 10/2007 |
| TW | 374024 | 11/1999 |
| TW | 1237576 B | 8/2005 |

OTHER PUBLICATIONS

Dragon Quest VII Eden no Senshitachi, Shukan Fami Tsu 9 Gatsu 1 Nichi Go, Sep. 1, 2000, pp. 89-97, vol. 15, No. 35.
International Preliminary Report on Patentability and Written Opinion corresponding to International Application No. PCT/JP2009/062004.
Taiwanese Office Action issued in Taiwanese Patent Application No. 98122723 dated Aug. 10, 2012.

* cited by examiner

*Primary Examiner* — David L Lewis
*Assistant Examiner* — Robert Mosser
(74) *Attorney, Agent, or Firm* — Sughrue Mion, PLLC

(57) ABSTRACT

To provide a game device for allowing a user to concentrate on an operation of one or more specific player characters and also capable of reducing a period of time with the user being left rarely able to be useful in a match. According to the present invention, a game of a sport match carried out between a first team operated by the user and a second team is carried out. A participating player selecting section (86) selects a plurality of player characters as operation candidates from among a plurality of player characters belonging to the first team and participating in a match, based on an operation of a user. An operation target player switching section (88) switches, in the match, a user's operation target among the plurality of player characters selected by the operation target candidate player selecting section (86). A player control section (90) causes, in the match, a player character which is the user's operation target to act, based on an operation by the user.

16 Claims, 9 Drawing Sheets

FIG.8

| PLAYER ID | PARTICIPATION FLAG | POSITION | OPERATION TARGET CANDIDATE FLAG | OPERATION TARGET FLAG | BALL KEEPING FLAG |
|---|---|---|---|---|---|
| P101 | 1 | GK | 0 | 0 | 0 |
| P102 | 1 | DF1 | 1 | 0 | 0 |
| P103 | 1 | DF2 | 0 | 0 | 0 |
| ... | ... | ... | ... | ... | ... |
| P105 | 1 | MF1 | 1 | 1 | 1 |
| P106 | 2 | — | 0 | 0 | 0 |
| ... | ... | ... | ... | ... | ... |
| P108 | 1 | FW1 | 1 | 0 | 0 |
| ... | ... | ... | ... | ... | ... |
| P113 | 1 | MF2 | 0 | 0 | 0 |
| ... | ... | ... | ... | ... | ... |
| P118 | 0 | — | 0 | 0 | 0 |
| P201 | 1 | GK | 0 | 0 | 0 |
| ... | ... | ... | ... | ... | ... |
| P218 | 0 | — | 0 | 0 | 0 |

FIG.11

| GAME PLAN | FORMATION | POSITION |
|---|---|---|
| LEFT-SIDE ATTACK | 4-3-3 | FW1, MF1, DF1 |
| RIGHT-SIDE ATTACK | 4-3-3 | FW3, MF3, DF4 |
| CENTRAL BREAKTHROUGH | 4-3-3 | FW2, MF2, DF2, DF3 |
| COUNTER ATTACK | 4-3-3 | FW1, FW2, FW3, DF1, DF2, DF3, DF4 |
| . . . | . . . | . . . |

GAME DEVICE, METHOD FOR CONTROLLING GAME DEVICE, PROGRAM, AND INFORMATION STORAGE MEDIUM

TECHNICAL FIELD

The present invention relates to a game device, a method for controlling a game device, a program, and an information storage medium.

BACKGROUND ART

There is known a game of a sport match to be played between a first team operated by a user and a second team. For example, a soccer game, a basket ball game, an ice hockey game, or the like, is known. In some of the sport games, a player character operated by a user is fixed to one of the player characters belonging to the first team so that the user can concentrate on an operation of the player character.

PRIOR ART DOCUMENT

Patent Document

Patent Document 1: JP 2001-353358 A

DISCLOSURE OF THE INVENTION

Problems to be Solved by the Invention

However, in a sport game in which a player character operated by a user is fixed to one player character, when, for example, that player character is located away from a ball (or a puck), a user can not be very useful in the match. That is, in the above described sport game, a period of time with a user left rarely able to be useful in a match tend to increase.

The present invention has been conceived in view of the above, and aims to provide a game device, a method for controlling a game device, a program, and an information storage medium for enabling a user to concentrate on an operation of one or more specific player characters and also enabling reduction of a period of time with a user left rarely able to be useful in a match.

Means for Solving the Problems

In order to solve the above described problem, a game device according to the present invention is a game device for carrying out a game of a sport match between a first team operated by a user and a second team, comprising: participating player selecting means for selecting a plurality of player characters to participate in the match from among a plurality of player characters belonging to the first team; operation target candidate player selecting means for selecting a plurality of player characters as operation target candidates from among the plurality of player characters selected by the participating player selecting means, based on an operation by the user; operation target player switching means for switching, in the match, a user's operation target among the plurality of player characters selected by the operation target candidate player selecting means; and operation target player control means for causing, in the match, a player character which is the user's operation target to act, based on an operation by the user.

Also, a control method for a game device according to the present invention is a control method for controlling a game device for carrying out a game of a sport match between a first team operated by a user and a second team, the control method comprising: a participating player selecting step of selecting a plurality of player characters to participate in the match from among a plurality of player characters belonging to the first team; an operation target candidate player selecting step of selecting a plurality of player characters as operation target candidates from among the plurality of player characters selected at the participating player selecting step, based on an operation by the user; an operation target player switching step of switching, in the match, a user's operation target among the plurality of player characters selected at the operation target candidate player selecting step; and an operation target player control step of causing, in the match, a player character which is the user's operation target to act, based on an operation by the user.

Also, a program according to the present invention is a program for causing a computer, such as a consumer game device (an installation type game device), a portable game device, a commercial game device, a portable phone, a personal digital assistant (PDA), a personal computer, or the like, to function as a game device for carrying out a game of a sport match between a first team operated by a user and a second team, the program for causing the computer to function as: participating player selecting means for selecting a plurality of player characters to participate in the match from among a plurality of player characters belonging to the first team; operation target candidate player selecting means for selecting a plurality of player characters as operation target candidates from among the plurality of player characters selected by the participating player selecting means, based on an operation by the user; operation target player switching means for switching, in the match, a user's operation target among the plurality of player characters selected by the operation target candidate player selecting means; and operation target player control means for causing, in the match, a player character which is the user's operation target to act, based on an operation by the user.

An information storage medium according to the present invention is a computer readable information storage medium storing the above described program.

According to the present invention, it is possible to arrange such that a user can concentrate on an operation of one or more specific player characters, and also to reduce a period of time with a user left rarely able to be useful in a match.

According to one aspect of the present invention, the game device may further comprise operation target candidate showing means for showing the plurality of player characters selected by the operation target candidate player selecting means in a game screen displayed in the match.

According to one aspect of the present invention, the operation target candidate player selecting means may include selection encouraging means for encouraging the user to select a plurality of player characters from among the plurality of player characters selected by the participating player selecting means, and the operation target candidate player selecting means may select, as the operation target candidates, the plurality of player characters selected by the user from among the plurality of player characters selected by the participating player selecting means.

According to one aspect of the present invention, the game device may further comprise: setting encouraging means for encouraging the user to set action control information concerning action control for player characters belonging to the first team; and teammate player control means for causing, in the match, a player character which is not the user's operation target, among the plurality of player characters selected by the participating player selecting means, to act based on the action control information set by the user. The operation target candidate player selecting means may select a plurality of player characters as the operation target candidates from among the plurality of player characters selected by the participating player selecting means, based on the action control information.

According to one aspect of the present invention, the game device may further comprise setting means for setting action control information concerning action control of player characters belonging to the second team; and opponent player control means for causing, in the match, a player character belonging to the second team and participating in the match to act, based on the action control information. The operation target candidate player selecting section may select a plurality of player characters as the operation target candidates from among the plurality of player characters selected by the participating player selecting means, based on the action control information.

According to one aspect of the present invention, the game device may further comprise selection control information storage means for storing selection control information concerning selection of the operation target candidates so as to be correlated to a condition concerning the action control information. The operation target candidate player selecting means may select a plurality of player characters as the operation target candidates from among the plurality of player characters selected by the participating player selecting means, based on the selection control information correlated to the condition which is satisfied by the action control information set by the user.

According to one aspect of the present invention, the game device may further comprise skill information obtaining means for obtaining skill information concerning a game skill level of the user. The operation target candidate player selecting means may select a plurality of player characters as the operation target candidates from among the plurality of player characters selected by the participating player selecting means, based on the skill information.

According to one aspect of the present invention, the game device may further comprise selection control information storage means for storing selection control information concerning selection of the operation target candidates so as to be correlated to a condition concerning the skill information. The operation target candidate player selecting means may select a plurality of player characters as the operation target candidates from among the plurality of player characters selected by the participating player selecting means, based on the selection control information correlated to the condition which is satisfied by the skill information.

A game device according to the present invention may comprise selection control information storage means for storing selection control information concerning selection of operation target candidates so as to be correlated to a condition concerning predetermined information; operation target candidate selecting means for selecting a plurality of operation target candidate game characters from among a plurality of game characters, based on the selection control information correlated to the condition satisfied by the predetermined information; operation target player switching means for switching, in a game, a user's operation target among the plurality of operation target candidate game characters; and operation target control means for causing, in the game, a game character which is the user's operation target to act, based on an operation by the user.

A control method for controlling a game device according to the present invention comprises a step of reading content stored in selection control information storage means for storing selection control information concerning selection of operation target candidates so as to be correlated to a condition concerning predetermined information; an operation target candidate selecting step of selecting a plurality of operation target candidate game characters from among a plurality of game characters, based on selection control information correlated to a condition satisfied by the predetermined information; an operation target player switching step of switching, in a game, a user's operation target among the plurality of operation target candidate game characters; and an operation target control step of causing, in the game, a game character which is the user's operation target to act, based on an operation by the user.

A program according to the present invention may be a program for causing a computer to function as a game device, the program for causing the computer to function as: selection control information storage means for storing selection control information concerning selection of operation target candidates so as to be correlated to a condition concerning predetermined information; operation target candidate selecting means for selecting a plurality of operation target candidate game characters from among a plurality of game characters, based on selection control information correlated to a condition satisfied by the predetermined information; operation target player switching means for switching, in a game, a user's operation target among the plurality of operation target candidate game characters; and operation target control means for causing, in the game, a game character which is the user's operation target to act, based on an operation by the user.

According to one aspect of the present invention, the game device may further comprise setting encouraging means for encouraging the user to set action control information concerning action control of a game character, and non-operation target control means for causing a game character which is not the user's operation target, among the plurality of game characters, to act based on the action control information. The predetermined information may be the action control information.

According to one aspect of the present invention, the game device may further comprise setting means for setting action control information concerning action control of an opponent game character which opposes the plurality of game characters, and opponent control means for causing the opponent game character to act based on the action control information. The predetermined information may be the action control information.

According to one aspect of the present invention, the predetermined information may be skill information concerning a skill level of the user.

BRIEF DESCRIPTION OF THE DRAWINGS

FIG. 8 is a diagram showing one example of player state data;

FIG. 11 is a diagram showing another example of data for selecting one or more operation target candidates for a user, based on a strategy set by the user.

BEST MODE FOR CARRYING OUT THE INVENTION

In the following, one example of an embodiment of the present invention will be described in detail with reference to the accompanying drawings. A game device according to an embodiment of the present invention is realized using, for example, a consumer game device (an installation type game device), a portable game device, a portable phone, a personal digital assistant (PDA), a personal computer, or the like. Herein, a case in which a game device according to an embodiment of the present invention is realized using a consumer game device will be described.

Figure 1:
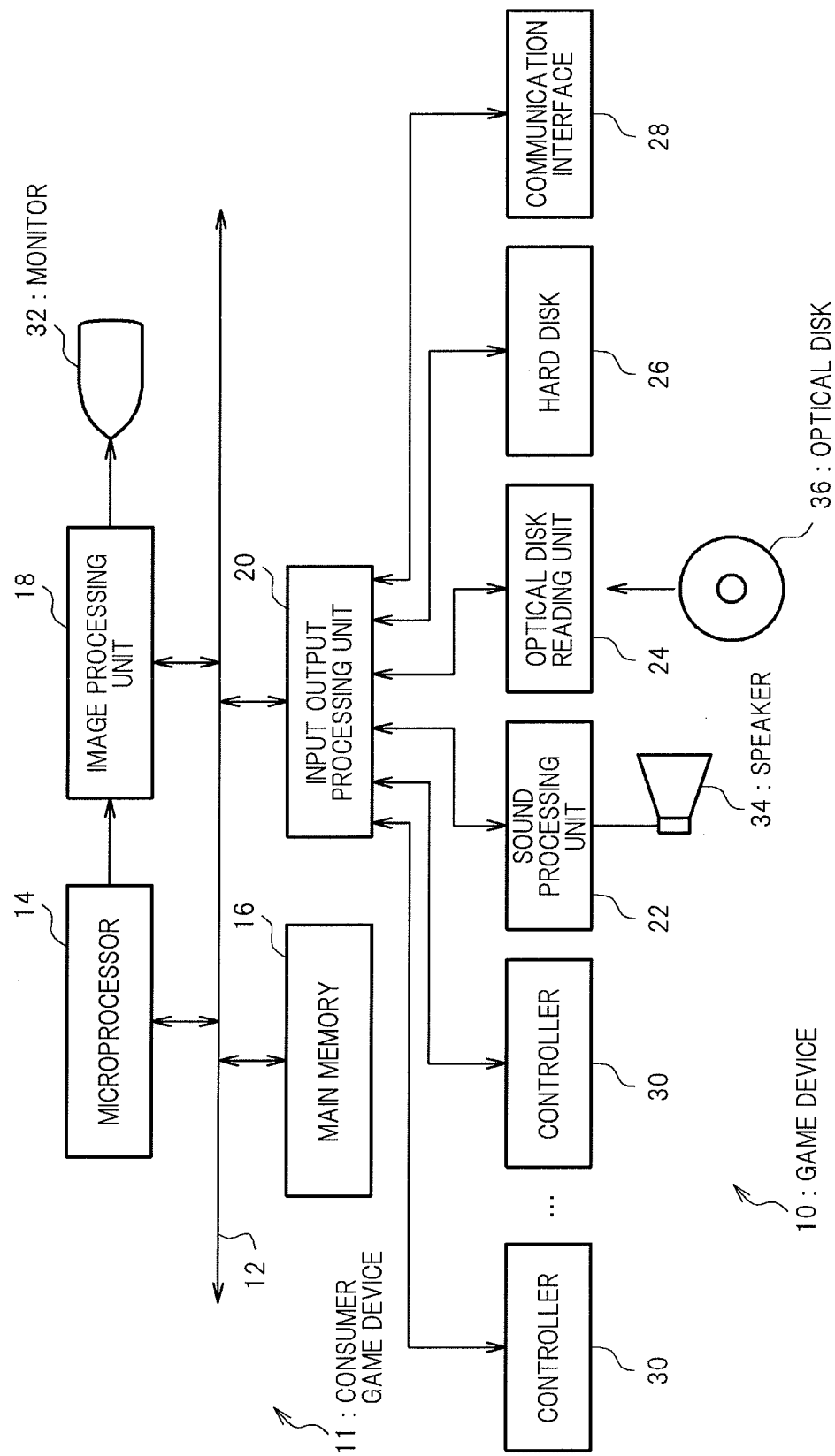
FIG. 1 is a diagram showing a hardware structure of a game device according to an embodiment of the present invention.

FIG. 1 is a diagram showing an entire structure of a game device according to an embodiment of the present invention. A game device 10 shown in FIG. 1 comprises a consumer game device 11, a monitor 32, a speaker 34, and an optical disk 36 (information storage medium). The monitor 32 and the speaker 34 are connected to the consumer game device 11. For example, a home-use television set receiver is used as the monitor 32, a speaker built into a home-use television set receiver is used as the speaker 34.

The consumer game device 11 is a publicly known computer game system. The consumer game device 11 comprises a bus 12, a microprocessor 14, a main memory 16, an image processing unit 18, an input output processing unit 20, a sound processing unit 22, an optical disk reading unit 24, a hard disk 26, a communication interface 28, and a controller 30. Structural elements other than the controller 30 are accommodated in an enclosure of the consumer game device 11.

The microprocessor 14 controls the respective units of the consumer game device 11, based on an operating system stored in a ROM (not shown) and a program read from the optical disk 36 or the hard disk 26. The main memory 16 comprises, for example, a RAM. A program and data read from the optical disk 36 or the hard disk 26 is written into the main memory 16 when necessary. The main memory 16 is used also as a working memory of the microprocessor 14. The bus 12 is used to exchange an address and data among the respective units of the consumer game device 11. The microprocessor 14, the main memory 16, the image processing unit 18, and the input output processing unit 20 are connected for mutual data communication via the bus 12.

The image processing unit 18 includes a VRAM and renders a game screen image into the VRAM, based on image data supplied from the microprocessor 14. The image processing unit 18 converts a game screen image rendered in the VRAM into a video signal and outputs to the monitor 32 at a predetermined time.

The input output processing unit 20 is an interface via which the microprocessor 14 accesses the sound processing unit 22, the optical disk reading unit 24, the hard disk 26, the communication interface 28, and the controller 30. The sound processing unit 22 has a sound buffer, and reproduces various sound data, such as game music, game sound effects, a message, or the like, read from the optical disk 36 or the hard disk 26 into the sound buffer, and outputs via the speaker 34. The communication interface 28 is an interface for connecting the consumer game device 11 to a communication network, such as the Internet, or the like in either a wired or wireless manner.

The optical disk reading unit 24 reads a program and data recorded on the optical disk 36. Although the optical disk 36 is used here to provide a program and data to the consumer game device 11, any other information storage medium, such as a memory card, or the like, may be used instead. Alternatively, a program and data may be supplied via a communication network, such as the Internet or the like, from a remote place to the consumer game device 11. The hard disk 26 is a typical hard disk device (an auxiliary memory device).

The controller 30 is a general purpose operation input means on which a user inputs various game operations. A plurality of controllers 30 can be connected to the consumer game device 11. The input output processing unit 20 scans the state of the controller 30 every constant cycle (for example, every $1/60^{th}$ of a second) and forwards an operating signal describing a scanning result to the microprocessor 14 via the bus 12, so that the microprocessor 14 can determine a game operation performed by a player, based on the operating signal. Note that the controller 30 may be connected in either a wired or wireless manner to the consumer game device 11.

In the game device 10, for example, a soccer game simulating a soccer match between a first team and a second team is carried out. This soccer game is realized by executing a program read from the optical disk 36 or the hard disk 26. In the following, this soccer game will be described. In the following, it is assumed that the first team is operated by one user and the second team is operated by a computer, though alternatively the first team may be cooperatively operated by two or more users, and the second team may be operated by another user.

Figure 2:
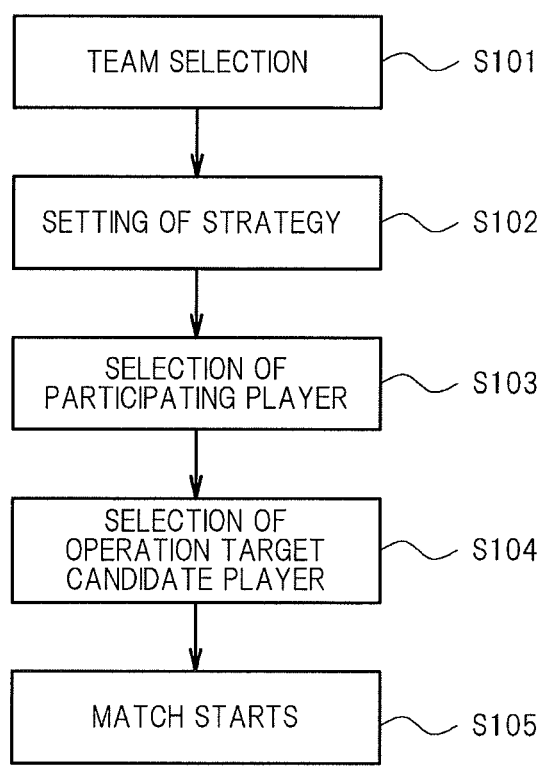
FIG. 2 is a diagram showing a flow of a soccer game.

Initially, a flow of a soccer game will be described. FIG. 2 is a diagram showing one example of a flow of a soccer game. As shown in FIG. 2, initially, a user selects a team to operate (first team) from among a plurality of teams prepared in advance (S101).

Figure 3:
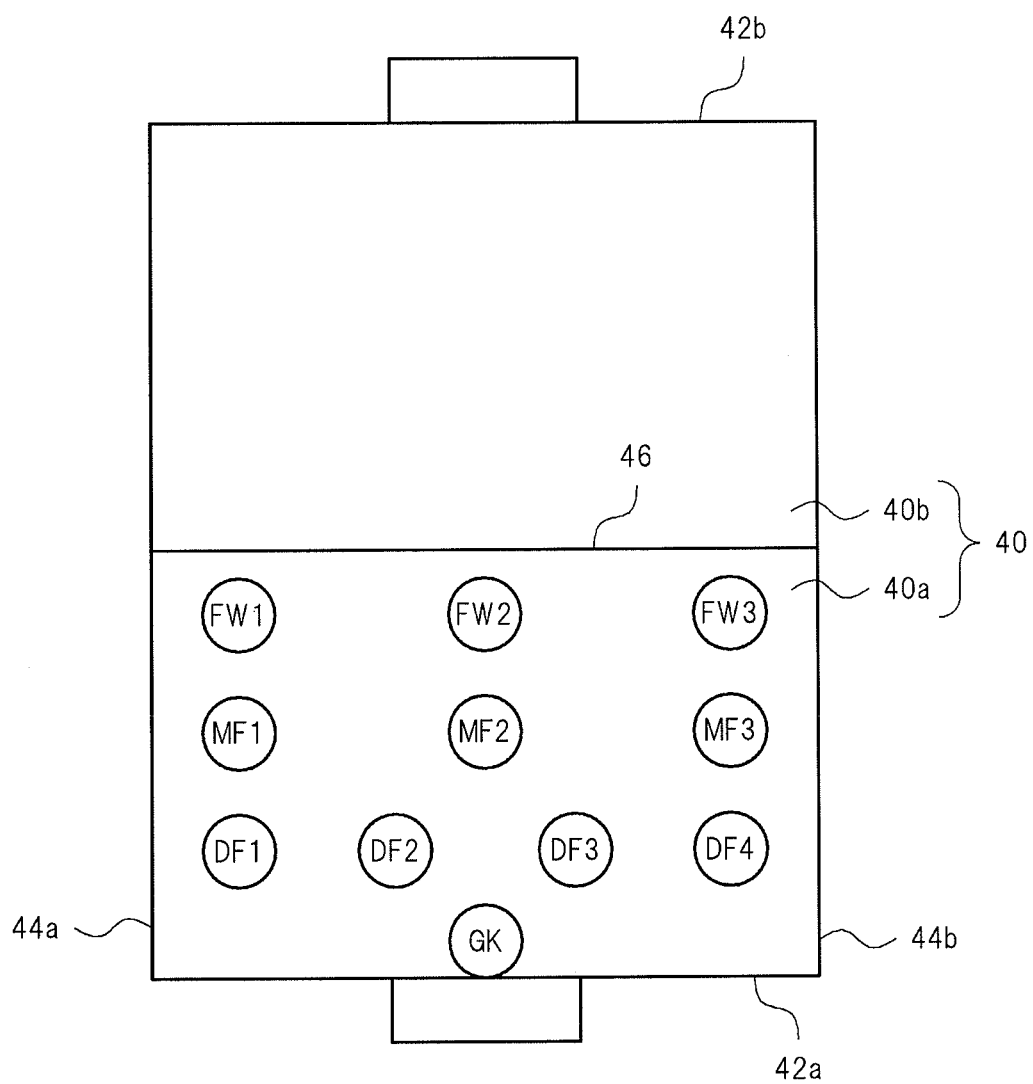
FIG. 3 is a diagram showing one example of a formation.

Thereafter, a user decides a strategy (action control information) for their own team (S102). Specifically, at S102, the microprocessor 14 (setting encouraging means) shows on the monitor 32 a screen for encouraging a user to decide a strategy for their own team. On the screen, a user designates, for example, a formation for their own team. That is, by selecting any one of a plurality of formations prepared in advance, a user determines deployment of forwards (FW), midfielders (MF), and defenders (DF). FIG. 3 is a diagram showing one example of a formation. The formation shown in FIG. 3 is generally referred to as "4-3-3", in which four defenders (DF1, DF2, DF3, DF4), three midfielders (MF1, MF2, MF3), three forwards (FW1, FW2, FW3), and a goal keeper (GK) are deployed. Note that an area 40 enclosed by the goal lines 42a, 42b, the left side line 44a, and the right side line 44b is referred to as a "pitch", and that an area 40a in the pitch 40 between the goal line 42a on its own team side and the half-way line 46 is referred to as an "own half", while an area 40b in the pitch 40 between the goal line 42b on the opponent team side and the half-way line 46 is referred to as an "opponent half".

On the above-described screen, a user selects any one of a plurality of game plans prepared in advance to decide a game plan for their own team. As game plans for a user to select, for example, "left-side attack", "right-side attack", "central breakthrough", "counter attack", and the like, are available. "Left-side attack" refers to a game plan in which an attack is made mainly utilizing an area near the left side line 44a; "right-side attack" refers to a game plan in which an attack is made mainly utilizing an area near the right side line 44b; "central breakthrough" refers to a game plan in which an attack is made mainly utilizing a central area; and "counter attack" refers to a game plan in which, while at least one player character is left in the opponent half 40b when the opponent team is attacking, a ball is taken from the opponent team and then passed to the player character in the opponent half 40b to quickly shift to an attack mode.

With setting of a team strategy completed, a user selects player characters to participate in a match from among player characters belonging to their own team (S103). That is, a user selects player characters to allocate to the respective positions in the formation selected at S102. At this step, a game screen for encouraging a user to select player characters to participate in a match is displayed on the monitor 32. For example, supposing that eighteen player characters belong to the team, a user selects on the screen eleven player characters from among the eighteen player characters.

Thereafter, a user selects one or more player characters as one or more operation target candidates from among those to participate in the match (S104). As will be described later, in a match, a user can operate only one or more player characters selected at S104 as one or more operation target candidates. In other words, a user concentrates on an operation of one or more player characters selected at S104 as one or more operation target candidates.

Figure 4:
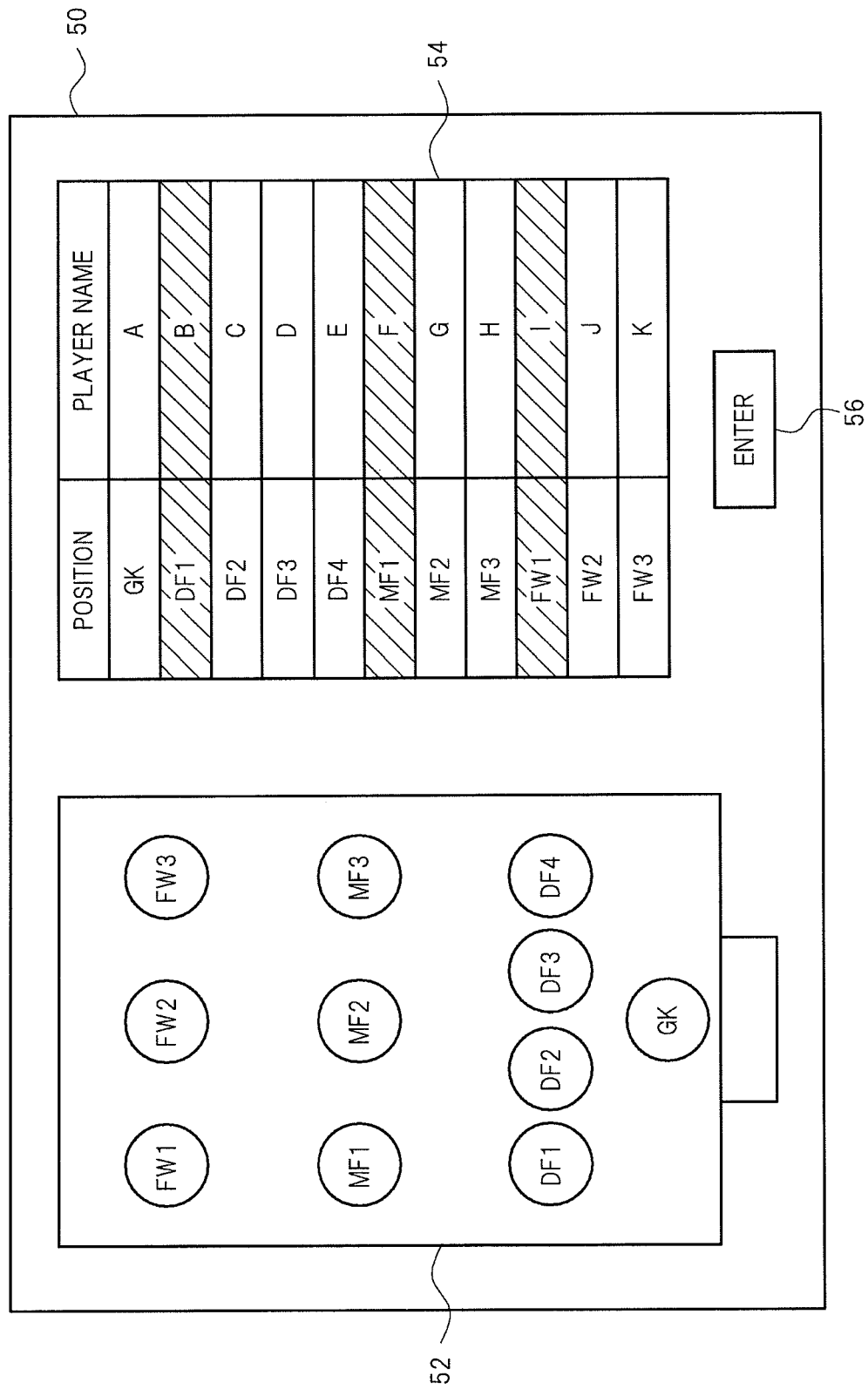
FIG. 4 is a diagram showing one example of a screen for a user to select one or more operation target candidates.

At this step, a screen (herein after referred to as a "selection screen") for encouraging a user to select one or more player characters as one or more operation target candidates from among those to participate in a match is displayed on the monitor 32. FIG. 4 shows one example of a selection screen. The selection screen 50 shown in FIG. 4 includes a formation section 52 and a participating player list 54. In the formation section 52, the formation selected by a user at S102 is shown. In the participating player list 54, the player characters selected by the user at S103 are listed. A user selects one or more player characters from among those shown in the participating player list 54. A player character selected by a user is distinctively shown on the selection screen 50. FIG. 4 shows a case in which the player characters B, F, and I are selected by a user as operation target candidates.

Note that an operation target candidate may be selected on the selection screen 50 by a user by designating either the name of a player character or a position name (for example, "DF1", "MF1", or the like, in FIG. 3).

With selection of one or more operation target candidates completed, a user designates the enter button 56. With the enter button 56 designated, a match starts (S105). A user can change the strategy or exchange players to participate in a match after the match has started. Further, a user can select again one or more operation target candidates after a match has started.

Figure 5:
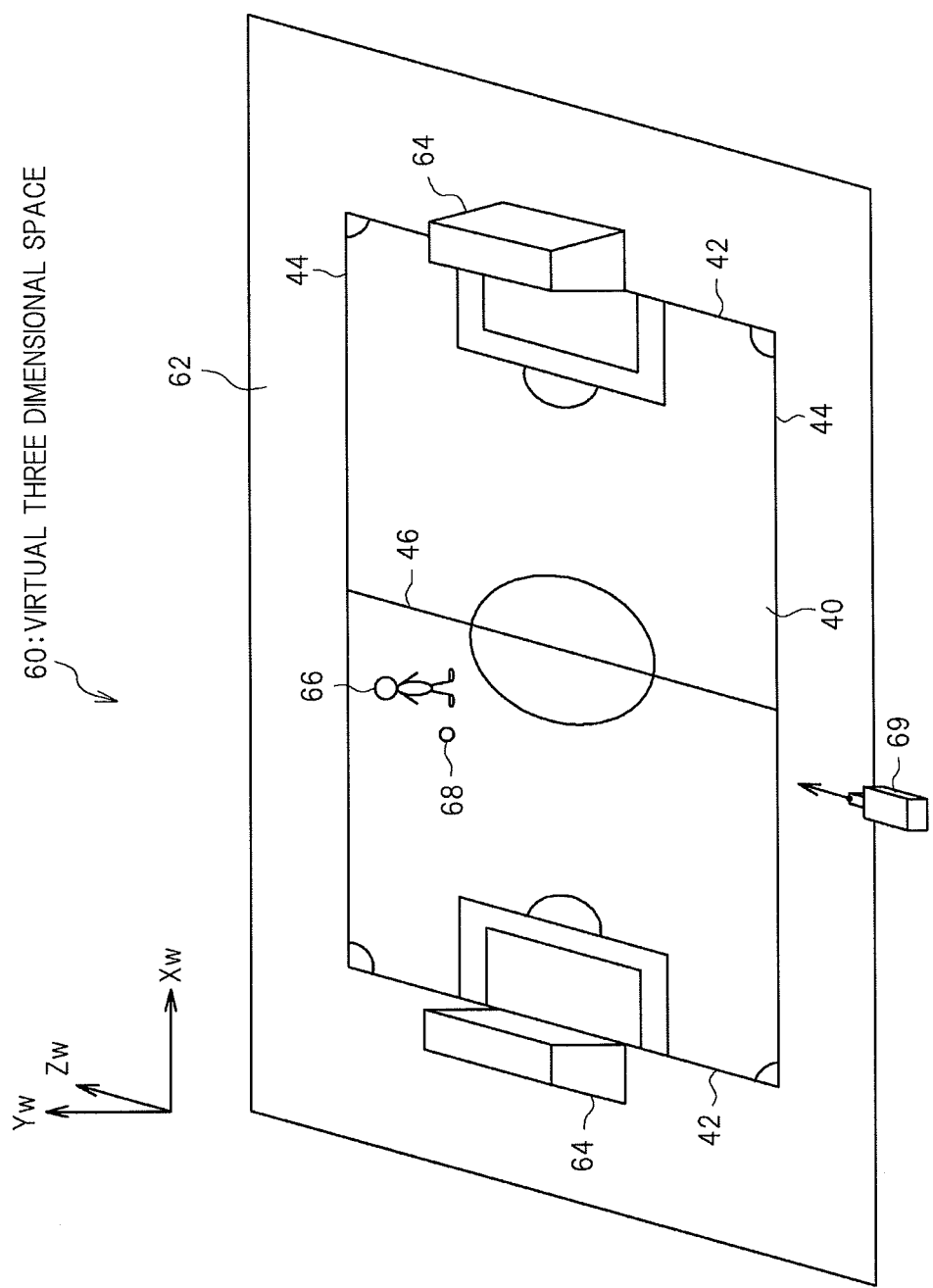
FIG. 5 is a diagram showing one example of a virtual three dimensional space.

With a match has started, in order to produce a game screen to be displayed in the match, a virtual three dimensional space is created in the main memory 16. FIG. 5 shows one example of a virtual three dimensional space. As shown in FIG. 5, a field 62, or an object representing a soccer field, is placed in the virtual three dimensional space 60. On the field 62, for example, the goal line 42, the side line 44, and the half-way line 46 are shown. Further, a goal 64, or an object representing a soccer goal, a player character 66, or an object representing a soccer player, and a ball 68, or an object representing a soccer ball, are also placed on the field 62.

One of the goals 64 is correlated to the first team, while the other goal 64 is correlated to the second team. With the ball 64 having moved into a goal correlated to either team, a score event occurs to the other team.

Although not shown in FIG. 5, eleven player characters 66 belonging to the first team and eleven player characters 66 belonging to the second team are placed on the field 62. For example, when a match starts, the eleven player characters 66 selected at S103 by a user from among those belonging to the first team, and eleven player characters 66 selected by the computer from among those belonging to the second team are placed on the field 62.

If a player character 66 and the ball 68 get closer to each other, the player character 66 and the ball 68 are correlated to each other under a predetermined condition. In such a case, the ball 68 moves according to movement of the player character 66, which is expressed as the player character 66 engaged in a dribble action. In the following, a state in which the ball 68 is correlated to a player character 66 will be described as "a player character 66 is in possession of the ball 68".

If a player character 66 is in possession of the ball 68 and the ball 68 and another player character 66 get closer to each other, the latter player character 66 and the ball 68 are correlated to each other under a predetermined condition. In this manner, the latter player character 66 takes the ball 68 kept by the former player character 66.

A virtual camera 69 (viewpoint) is set in the virtual three dimensional space 60, and moves therein based on the movement of the ball 68. A game screen showing a picture obtained by viewing the virtual three dimensional space 60 from the virtual camera 69 is displayed on the monitor 32.

Figure 6:
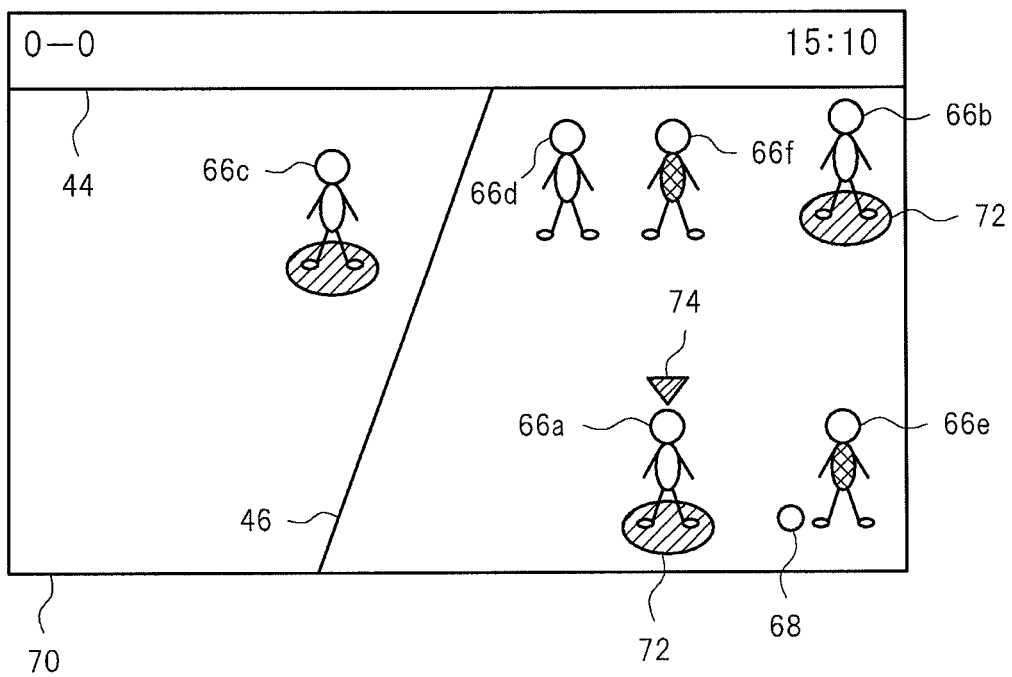
FIG. 6 is a diagram showing one example of a game screen displayed in a match.

FIG. 6 shows one example of a game screen displayed in a match. On the game screen 70 shown in FIG. 6, six player characters 66a, 66b, 66c, 66d, 66e, 66f are shown, including four player characters 66a to 66d belonging to the first team and two player characters 66e, 66f belonging to the second team.

Oval first mark images 72 are shown under the feet of the player characters 66a, 66b, 66c. Although being shown oval in FIG. 6 as being viewed from diagonally above, the first mark image 72 is round when viewed from directly above. The first mark image 72 is shown under the feet of a player character 66 selected by a user at S104 in FIG. 2 as an operation target candidate, to thereby identify the player character 66 selected by a user as an operation target candidate. A triangular second mark image 74 is shown above the head of the player character 66a. The second mark image 72 is shown above the player character 66 which is the user's operation target, to thereby identify the player character 66 which is the user's current operation target.

The user's operation target is switched among the player characters 66 selected by the user at S104 in FIG. 2 as operation target candidates, according to the movement of the ball 68 or a switching instruction operation by the user.

On principle, for example, a player character 66 located closest to the ball 68 among those selected by a user as operation target candidates is selected as a user's operation target. Specifically, in the situation shown in FIG. 6, the player character 66a located closest to the ball 68 is set as a user's operation target. Then, in the situation shown in FIG. 6, when the player character 66e passes the ball 68 to the player character 66f, the user's operation target is switched from the player character 66a to the player character 66b. Note that in the above, although the player character 66d is located closer to the ball 68 (player character 66f) than the player character 66b, the player character 66d is not set as a user's operation target as the player character 66d is not selected as an operation target candidate. Instead, the player character 66b, or a player character located closest to the ball 68 among those selected as operation target candidates, is set as a user's operation target.

In addition, if a user makes a switching instruction operation, a player character 66 which is selected as an operation target candidate and is then located closest to the ball 68, among the player characters 66 which are not the user's current operation target, is set as a user's operation target. For example, if a user makes a switching instruction operation in the situation shown in FIG. 6, the user's operation target is switched to the player character 66b, which is located closest to the ball 68 except for the player character 66a, among the player characters 66a, 66b, 66c selected as operation target candidates.

The player character 66 which is the user's operation target acts based on a user operation. For example, a player character 66 which is the user's operation target moves according to a direction instruction operation by a user. For example, if a player character 66 which is the user's operation target in possession of the ball 68, the player character 66 carries out a pass or shoot action according to a pass or shoot instruction operation by a user.

Meanwhile, player characters 66 (hereinafter referred to as "teammate player characters") other than the player character 66 which is the user's operation target among those belonging to the first team act according to a predetermined algorithm. For example, action by each teammate player character is controlled based on the position to which the teammate player character is allocated and the game plan selected by a user at S102 in FIG. 2. That is, a teammate player character is controlled so as to act according to the game plan selected by a user. Note that the player characters 66 belonging to the second team also act according to a predetermined algorithm. A strategy is set for the second team (player characters of the second team), so that the player characters 66 belonging to the second team are controlled so as to act based on this strategy. The strategy for the second team is set by the microprocessor 14 (setting unit). For example, a predetermined strategy among a plurality of strategies is set for the second team. Alternatively, a strategy selected from among a plurality of strategies, based on, for example, a random number may be set for the second team.

As described above, in this embodiment, the user's operation target is switched among the player characters 66 selected by a user as operation target candidates. This enables a user to concentrate on an operation of one or more player characters 66 selected by themselves as one or more operation target candidates.

In this embodiment in particular, a user can select a plurality of player characters 66 as operation target candidates. Here, assume a case in which a user can select only one player character 66 as an operation target candidate, that is, a user's operation target is fixed to one player character 66. In this case, when a player character 66 operated by a user is located away from the ball 68, a user can perform only an operation for simply moving the player character 66, and can rarely be useful in a match. That is, in this case, it is likely to result in a user who is left for a longer period of time, being rarely able to be useful in a match. Regarding this point, in this embodiment, as a user can select a plurality of player characters 66 as operation target candidates so that the user's operation target is switched among the plurality of player characters 66, a period of time with a user left rarely able to be useful in a match, as described above, can be reduced.

In this embodiment, a user can limit a player character 66 to operate in a variety of manners. For example, a user can limit a player character 66 to operate, while taking into consideration an area in the pitch 40. Specifically, a user can select only player characters 66 ("FW1", "MF1", "DF1" in FIG. 3) in positions closer to the left side line 44a as operation target candidates. That is, a user can limit a player character 66 to operate to those in positions closer to the left side line 44a. Alternatively, a user can limit a player character 66 to operate, while taking into consideration, for example, a position type. Specifically, a user can select only a forward player character 66 as an operation target candidate. That is, a user can limit a player character 66 to operate to a forward player character.

In the game screen 70 in this embodiment, as a player character 66 selected by a user as an operation target candidate is identified by the first mark image 72, a user can instantly know which player character 66 is a player character 66 selected by themselves as an operation target candidate. Further, in the above-described soccer game, as the player character 66 operated by a user is identified by the second mark image 74, a user can instantly know which player character 66 they are operating.

Figure 7:
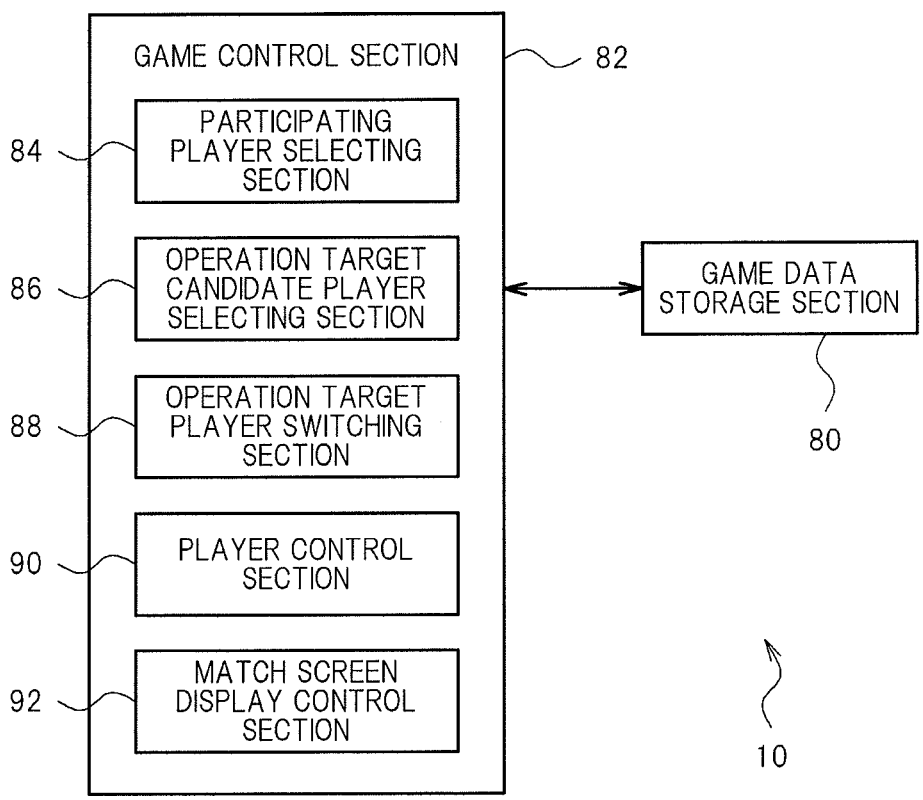
FIG. 7 is a functional block diagram of a game device.

In the following, a structure for realizing the above-described soccer game will be described. FIG. 7 is a functional block diagram mainly showing functions according to the present invention among those realized in the game device 10. As shown in FIG. 7, the game device 10 includes a game data storage section 80 and a game control section 82. These function blocks are realized by the microprocessor 14 by carrying out a program.

The game data storage section 80 is realized, using, for example, the main memory 16, the hard disk 26, or the optical disk 36. The game data storage section 80 stores game data for realizing a soccer game. For example, a plurality of team data, a plurality of formation data, and a plurality of game plan data are stored in the game data storage section 80. Each team data includes a list of player characters belonging to the team.

Data describing the results selected at S101 and S102 in FIG. 2 is stored in the game data storage section 80. That is, data describing the team, formation, and game plan selected by a user is stored in the game data storage section 80.

Game situation data describing a situation in a soccer game is stored in the game data storage section 80. For example, player state data describing a state of each player character is stored in the game data storage section 80. FIG. 8 shows one example of player state data. The player state data shown in FIG. 8 includes "player ID", "participation flag", "position", "operation target candidate flag", "operation target flag", and "ball keeping flag" fields.

A "player ID" is information uniquely identifying a player character. In FIG. 8, player characters having player ID's "P101" to "P118" belong to the first team, while those having player ID's "P201" to "P218" belong to the second team.

A "participation flag" takes values 0, 1, 2. The value "0" indicates that a player character has not participated in a match yet; the value "1" indicates that a player character is participating in a match; the value "2" indicates that a character participated in a match but currently is not participating in the match as they have been exchanged with another player character.

An "operation target candidate flag" indicates whether or not a player character is selected as an operation target candidate, and takes a value of either 0 or 1. A value "0" indicates that a player character is not an operation target candidate; and a value "1" indicates that a player character is an operation target candidate.

An "operation target flag" indicates whether or not a player character is a user's operation target, and takes a value of either 0 or 1. A value "0" indicates that a player character is not a user's current operation target; a value "1" indicates that a player character is a user's current operation target.

A "ball keeping flag" indicates whether or not a player character is in possession of a ball, and takes a value of 0 or 1. A value "0" indicates that a player character is not in possession of a ball; and a value "1" indicates that a player character is in possession of a ball.

Although not shown in FIG. 8, the player state data includes, for example, data indicating a location or posture of a player character 66 placed in the virtual three dimensional space 60, in addition to the above described information.

For example, data describing a location, a movement direction, and a moving speed of the ball 68, and data describing a location and a viewing direction of the virtual camera 69, are stored in the game data storage section 80. For example, data describing scores of the respective teams and a period of time elapsed is also stored in the game data storage section 80.

The game control section 82 is realized mainly using, for example, the microprocessor 14. The game control section 82 includes a participating player selecting section 84, an operation target candidate player selecting section 86, an operation target player switching section 88, a player control section 90, and a match screen display control section 92.

The participating player selecting section 84 corresponds to S103 in FIG. 2. Specifically, the participating player selecting section 84 selects a plurality of player characters as player characters to participate in a match from a plurality of player characters belonging to the team. For example, the participating player selecting section 84 shows on the monitor 32 a screen for encouraging a user to select a plurality of player characters from among those belonging to the team, and then selects the plurality of player characters selected by the user on the screen as player characters to participate in a match. In addition, the participating player selecting section 84 updates the "participating player flag" in the player state data (see FIG. 8), based on the selection result.

The operation target candidate player selecting section 86 corresponds to S104 in FIG. 2. Specifically, the operation target candidate player selecting section 86 selects one or more player characters as one or more operation target candidates from among those to participate in a match. For example, the operation target candidate player selecting section 86 (selection encouraging means) shows a selection screen 50 (see FIG. 4) on the monitor 32, and then selects, as one or more operation target candidates for a user, the one or more player characters selected by the user on the selection screen 50. In addition, the operation target candidate player selecting section 86 updates the "operation target candidate flag" in the player state data (see FIG. 8), based on the selection result.

In a match, the operation target player switching section 88 switches the user's operation target among the player characters 66 selected as operation target candidates. For example, switching the user's operation target is executed based on the movement of the ball 68 or the switching instruction operation by a user, with details thereof to be described later (see S201 and S202 in FIG. 9).

The player control section 90 controls action of a player character 66 in a match. For example, the player control section 90 controls the player characters 66 belonging to the first team as follows. Specifically, the player control section 90 (operation target player control means) controls a player character 66 operated by a user to act based on the content of an operation by a user. For example, the player control section 90 causes a player character 66 operated by a user to move based on a movement instruction operation by the user. For example, the player control section 90 causes a player character 66 operated by a user to make a pass or shoot action, based on a pass or shoot action instruction operation by the user. Alternatively, the player control section 90 (teammate player control means) causes a teammate player character to act based on a strategy (a game plan or the like) set by a user. That is, the player control section 90 causes a teammate player character to act in accordance with a strategy (game plan or the like) selected by a user. As described above, the strategy selected by a user at S102 in FIG. 2 is used as a basis for action control of a teammate player character.

In a match, the match screen display control section 92 (operation target candidate showing means) shows on the monitor 32 a game screen 70 (see FIG. 6) showing a picture obtained by viewing the virtual three dimensional space 60 from the virtual camera 69.

Figures 9, 10:
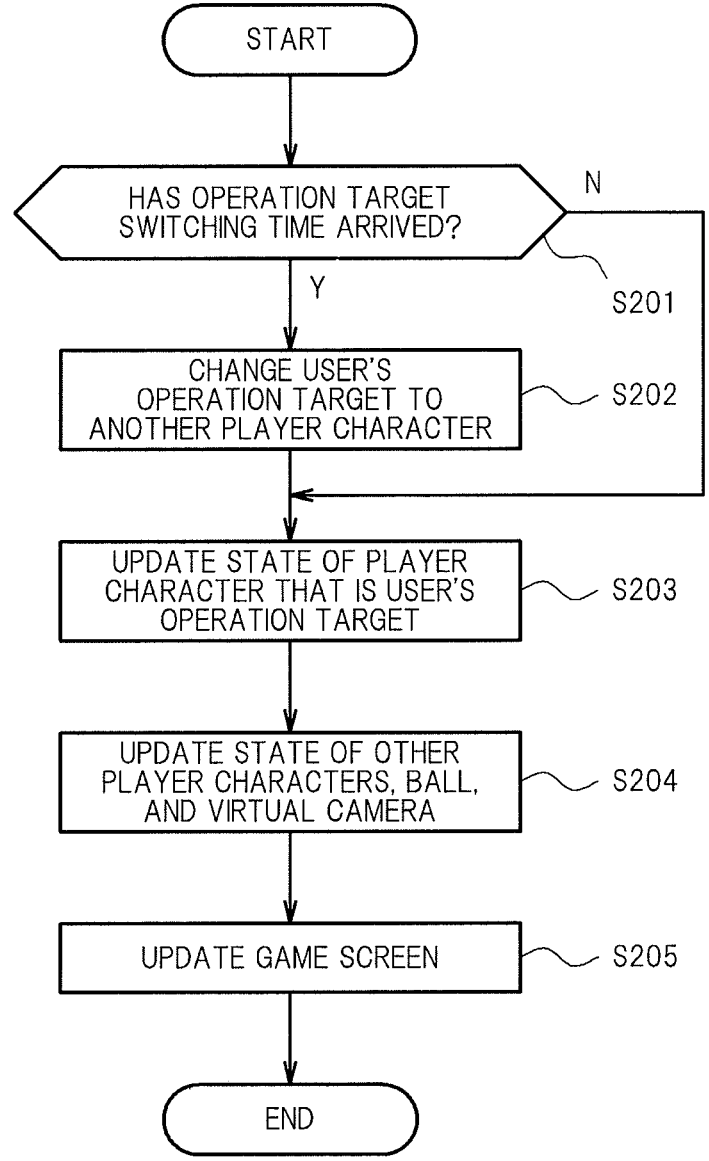
FIG. 9 is a flowchart of a process carried out in the game device.
FIG. 10 is a diagram showing one example of data for selecting one or more operation target candidates for a user, based on a strategy set by the user.

In the following, a process to be carried out by the game device 10 will be described. FIG. 9 is a flowchart mainly of a process according to the present invention among those to be carried out by the game device 10 every predetermined period of time (for example, $\frac{1}{60}^{th}$ of a second) after a match starts and before the match ends. The microprocessor 14 carries out the process shown in FIG. 9 according to a program stored in the optical disk 36.

As shown in FIG. 9, initially, the microprocessor 14 (operation target player switching section 88) determines whether or not a time to switch the user's operation target has arrived (S201). For example, in a case where there is a player character 66, among those selected by a user as operation target candidates, which is located closer to the ball 68 than the user's current operation target, it is determined that the switching time has arrived. In addition, for example, in a case where a user carries out a switching instruction operation (for example, a predetermined button being pressed), it is also determined that the switching time has arrived.

If it is determined that the switching time has arrived, the microprocessor 14 (operation target player switching section 88) switches the user's operation target to another player character 66 (S202). For example, if there is a player character 66, among player characters 66 selected by a user as operation target candidates, which is located closer to the ball 68 than the player character 66 which is the user's current operation target, that player character 66 is newly set as a user's operation target. Also, for example, if a user carries out a switching instruction operation (for example, a predetermined button being pressed), a player character 66 selected as an operation target candidate and located closest to the ball 68, among the player characters 66 which are not the user's current operation target, is newly set as a user's operation target. Note that the "operation target flag" of a player character 66 which becomes no longer a user's operation target is updated to 0, and that of a user's new operation target is updated to 1.

If the process of S202 is executed, or if it is determined at S201 that a switching time has not yet arrived, the microprocessor 14 (player control section 90) updates the state (for example, location, posture, or the like) of the player character 66 which is the user's operation target, based on the content of an operation by the user (S203). For example, if a movement instruction operation is carried out by the user, the location of the player character 66 which is the user's operation target is updated based on the movement direction designated by the user. In addition, for example, if a pass or shoot action instruction operation is carried out by the user, the posture of the player character 66 which is the user's operation target is updated based on the pass or shoot motion data.

The microprocessor 14 updates the states of player characters 66 other than the player character 66 which is the user's operation target, the ball 68, and the virtual camera 69 (S204).

For example, the microprocessor 14 (player control section 90) updates the state of a teammate player character of the first team, based on the strategy set by a user at S102. For example, the microprocessor 14 (opponent player control means) updates the state of the player character 66 belonging to the second team according to a predetermined algorithm. For example, the state of the ball 68 is updated based on an action (for example, dribble, pass, or shoot) of the player character 66. Further, for example, the state of the virtual camera 69 is updated based on the location of the ball 68.

Thereafter, the microprocessor 14 (match screen display control section 92) updates the game screen 70 (S205). That is, a game screen 70 showing a picture obtained by viewing the virtual three dimensional space 60 from the virtual camera 69 is created in the VRAM, based on the game situation data. Note that in the virtual three dimensional space 60 in this case, an object corresponding to the first mark image 72 is placed under the feet of a player character 66 selected by a user as an operation target candidate, and an object corresponding to the second mark image 74 is placed above the head of a player character 66 which is the user's operation target. The game screen 70 created in the VRAM is shown on the monitor 32.

According to the above-described game device 10, a user's operation target is switched among the player characters 66 selected by a user as operation target candidates. This enables a user to concentrate on an operation of player characters 66 selected by themselves as operation target candidates.

In the game device 10 in particular, a user can select a plurality of player characters 66 as operation target candidates. Here, assume a case in which a user's operation target is fixed to one player character 66. In this case, when the ball 68 is located away from the player character 66 operated by a user, a user can perform only an operation for simply moving the player character 66, and can rarely participate in the match. That is, in this case, it is likely to result in a user who is left for a longer period of time being rarely able to be useful in a match. Regarding this point, according to this game device 10, as a user's operation target is switched among a plurality of player characters 66 selected by the user as operation target candidates, it is possible to reduce a period of time with the user left rarely able to be useful in a match.

Further, according to the game device 10, as player characters 66 selected by the user as operation target candidates are identified on the game screen 70 in a match, the user can instantly know which player character 66 is a player character 66 selected by themselves as an operation target candidate.

Note that the present invention is not limited to the above-described embodiment.

First Modified Example

For example, the first mark image 72 may have any shape other than round (an oval). The first mark image 72 may be shown in any position other than a position under the feet of a player character 66 selected by a user as an operation target candidate. That is, the first mark image 72 may be shown in a position determined based on the location of the player character 66 selected by the user as the operation target candidate. Alternatively, instead of showing the first mark image 72, the player character 66 selected by the user as the operation target candidate may be displayed in a different manner (color, density, or the like) from that for other player characters 66.

That is, the player character 66 selected by the user as the operation target candidate may be identified on the game screen 70 in the above described manner.

Second Modified Example

For example, one team may be cooperatively operated by a plurality of users. In this case, one or more operation target candidates are selected for each user at S104 in FIG. 2.

Assume a case in which a first user and a second user cooperatively operate one team and also the formation "4-3-3" (see FIG. 3) is selected at S102 in FIG. 2.

In this case, for example, it is possible to set forward player characters 66 (FW1 to 3) as operation target candidates for the first user, and set defender player characters 66 (DF1 to 4) as operation target candidates for the second user. In this manner, it is possible to determine responsibilities of two users, while taking into consideration a position type.

Alternatively, for example, it is possible to set player characters 66 in positions (FW1, FW3, MF1 to 3) as operation target candidates for the first user, and those in positions (FW2, DF1 to 4) as operation target candidates for the second user. In this manner, it is possible to set such that midfielders or defenders are operated by one user and forwards are cooperatively operated by two users.

Assume a case in which a first user, a second user, and a third user cooperatively operate one team and also the formation "4-3-3" (see FIG. 3) is selected at S102 in FIG. 2.

In this case, for example, it is possible to set forward player characters 66 (FW1 to 3) as operation target candidates for the first user, midfielder player characters 66 (MF1 to 3) as operation target candidates for the second user, and defender player characters 66 (DF1 to 4) as operation target candidates for the third user. In this manner, it is possible to determine responsibilities of three users, while taking into consideration a position type.

Alternatively, for example, it is possible to set player characters 66 in positions (FW1, MF1, DF1) on the left side line 44a side as operation target candidates for the first user, those in positions (FW3, MF3, DF4) on the right side line 44b side as operation target candidates for the second user, and those in central positions (FW2, MF2, DF2, DF3) as operation target candidates for the third user. In this manner, it is possible to determine responsibilities of three users, while taking into consideration areas in the pitch 40.

Note that, for example, at least one user may not select an operation target candidate. For example, only a first user selects one or more operation target candidates, while second and third users do not select any operation target candidate. In the above, an operation target for the second or third user is switched among the player characters 66 which are not selected as an operation target candidate for the first user. For example, assuming that the first user is a beginner of a soccer game, forward player characters 66 (FW1 to 3) may be set as operation target candidates for the first user, and no operation target candidate is set for the second and third users. This gives an arrangement that allows the first user, or a beginner, to concentrate on only attacking, to thereby enjoy the game.

As described above, in a case in which one team is cooperatively operated by a plurality of users, responsibilities of the plurality of users can be determined in various manners.

Note that in a game screen 70 to be shown when first, second, and third users cooperatively operate one team, the first mark image 72 and the second mark image 74 may be shown in a different manner (color, shape, density, or the like) for each user to thereby distinctively indicate a player character 66 selected by the first user as an operation target candidate, a player character 66 selected by the second user as an operation target candidate, and a player character 66 selected by the third user as an operation target candidate. Alternatively, a player character 66 itself selected as an operation target candidate may be shown in a different manner (color, density, or the like) for each user, to thereby distinctively indicate the player characters 66 selected by the respective users as operation target candidates 66.

Third Modified Example

For example, at S104 in FIG. 2, one or more operation target candidates for a user may be automatically selected based on the strategy set by the user at S102. That is, one or more operation target candidates for the user may be automatically selected based on the strategy setting operation carried out by the user at S102. Note that only if the user carries out a predetermined operation, may one or more operation target candidates for the user be automatically selected based on the strategy set by the user at S102.

Here, assume a case in which the formation "4-3-3" (see FIG. 3) is selected by a user. In this case, if, for example, a game plan "left-side attack" is selected by the user, player characters 66 allocated to the positions related to the game plan, namely, the positions (FW1, MF1, DF1) on the left side line 44*a* side, are selected as operation target candidates for the users. Alternatively, if, for example, a game plan "counter attack" is selected by the user, player characters 66 allocated to the positions (FW1 to 3, DF1 to 4) related to the game plan are selected as operation target candidates for the user.

In this case, data for selecting one or more operation target candidates for a user based on a strategy set by the user is stored in the game data storage section 80 (selection control information storage means). For example, data correlating a condition concerning a strategy and selection control information concerning selection of one or more operation target candidates is stored. FIGS. 10 and 11 are diagrams showing an example of the data.

The data shown in FIG. 10 correlates a game plan and a position condition (condition concerning a position). In this case, one or more player characters allocated to one or more positions which satisfy a position condition correlated to the game plan selected by a user at S102 are selected as one or more operation target candidates for the user. For example, the data shown in FIG. 10 correlates a game plan "left-side attack" and a position condition "a position near the left side line". Thus, in the case where the formation "4-3-3" (see FIG. 3) and game plan "left-side attack" are selected by a user at S102, player characters 66 allocated to the positions (FW1, MF1, DF1) which satisfy the position condition "position near the left side line" correlated to the game plan "left-side attack" are selected as operation target candidates for the user.

The data shown in FIG. 11 correlates a position and a combination of a game plan and a formation. In this case, one or more player characters allocated to one or more positions correlated to the game plan and a formation selected by a user at S102 are selected as one or more operation target candidates for the user. For example, the data shown in FIG. 11 correlates a combination of the formation "4-3-3" and the game plan "left-side attack", and the positions "FW1, MF1, DF1". Thus, if the formation "4-3-3" (see FIG. 3) and the game plan "left-side attack" are selected by a user at S102, player characters 66 allocated to the positions (FW1, MF1, DF1) are selected as operation target candidates for the user.

In this case, it is possible to select one or more operation target candidates suitable for a strategy set by a user. Further, trouble for the user in selecting one or more operation target candidates suitable for a strategy set by them can be reduced.

Note that in the above case, if a user changes the strategy for their own team in a match, one or more operation target candidates for the user may be selected again based on the strategy after the change.

Fourth Modified Example

At, for example, S104 in FIG. 2, one or more operation target candidates for a user may be automatically selected based on a strategy set for the second team. In particular, one or more operation target candidates for the user may be automatically selected based on a strategy set for the second team only if the user carries out a predetermined operation.

Here, assume a case in which formation "4-3-3" (see FIG. 3) is selected by a user. In this case, if, for example, the game plan "left-side attack" is set for the second team, player characters 66 allocated to the positions important in interrupting the game plan, namely, positions (FW3, MF3, DF3) on the right side line 44*b* side, are selected as operation target candidates for the user.

This case can be realized in a similar manner to that in the third modified example. That is, this case can be realized using data similar to those shown in FIGS. 10 and 11.

In this case, it is possible to select one or more operation target candidates suitable for a strategy set for the opponent team (second team). Further, trouble for a user in selecting one or more operation target candidates suitable for a strategy set for the opponent team can be reduced. Note that in the above case, if the strategy for the opponent team is changed in a match, one or more operation target candidates for a user may be selected again based on the strategy after the change.

Fifth Modified Example

At, for example, S104 in FIG. 2, one or more operation target candidates for a user may be automatically selected based on the game skill of the user. In particular, one or more operation target candidates for a user may be automatically selected based on the game skill of the user only if the user carries out a predetermined operation.

In the above case, skill information about the level of the game skill of a user is stored in the game data storage section 80, and the microprocessor 14 (skill information obtaining means) obtains the skill information from the game data storage section 80 at S104 in FIG. 2. Note that skill information may be stored in a storage which is accessible via a communication network. The skill information may be information based on, for example, the match results (a total number of wins, a total number of losses), total score, or total conceded score of a user. For example, the skill information may be level information based on the match results, total score, or total conceded score of a user or may be the match results, total score, or total conceded score itself of a user.

In this case, data for selecting one or more operation target candidates for a user based on skill information is stored in the game data storage section 80. For example, data correlating a condition concerning skill information and selection control information concerning selection of one or more operation target candidates is stored, and one or more operation target candidates for a user are selected, based on the selection control information correlated to the skill information of the user.

Note that, for example, selection control information is information about the position of a player character selected as an operation target candidate. With the above, it is possible to set a player character in a position (for example, a defender)

with a relatively high difficulty as an operation target candidate for a user with a higher game skill level and a player character in a position (for example, a forward) with a relatively low difficulty as an operation target candidate for a user with a lower game skill level.

For example, the selection control information is information describing the number of player characters to be selected as operation target candidates. With the above, it is possible to select a relatively large number (for example, five) of player characters as operation target candidates for a user with a higher game skill level, and a relatively small number (for example, two) of player characters as operation target candidates for a user with a lower game skill level.

In the above case, it is possible to select one or more operation target candidates in accordance with the game skill level of a user. Further, trouble for a user in selecting one or more operation target candidates in accordance with their game skill level can be reduced.

Sixth Modified Example

For example, a game to be carried out in the game device 10 is not limited to a game in which a three dimensional game space formed using three coordinate elements is shown in a game screen. A game to be carried out in the game device 10 may be a game in which a two dimensional game space formed using two coordinate elements is shown in a game screen. That is, a game to be carried out in the game device 10 may be a game in which the location, or the like, of a ball and a player character is managed using two coordinate elements.

Seventh Modified Example

For example, a game to be carried out in the game device 10 may be a network game in which a plurality of users participate via a network. Further, a game to be carried out in the game device 10 may be a sport game other than a soccer game. For example, the present invention can be applied to a basket ball game carried out using a ball (moving object) or an ice hockey game carried out using a puck (moving object). For example, the present invention can be applied to a baseball game. For example, when a user team defends, a user's operation target may be switched among a plurality of player characters selected by a user in advance. In this manner, it is possible to arrange such that a user operates player characters in an infield, leaving operation of those in an outfield to a computer.

Eighth Modified Example

The present invention can be applied to a game other than a sport game. For example, a structure in the third, fourth, or fifth modified example can be applied to a game other than a sport game. Here, assume an action game in which a main character group corresponding to a user and an opponent character (opponent game character) opposing the main character group appear. In this case, the "main character group" corresponds to the "first team" in the above described soccer game, while the "opponent character" corresponds to a "player character belonging to the second team" in the above described soccer game.

In this action game, a user may select a plurality of operation target candidate game characters from among a plurality of game characters belonging to the main character group. Further, in a game, the user's operation target may be switched among a plurality of operation target candidate game characters.

In the action game, a user may set action control information (for example, a game plan, a formation, or the like) as a basis for action control for the game characters of a main character group so that action of a game character which is not set as a user's operation target among the game characters belonging to the main character group is controlled based on the action control information. Further, in this case, a plurality of operation target candidate game characters may be selected from among a plurality of game characters belonging to the main character group, based on the action control information set by a user.

In this action game, action of an opponent character may be controlled based on action control information set for an opponent character. In this case, a plurality of operation target candidate game characters may be selected from among a plurality of game characters belonging to the main character group, based on the action control information set for the opponent character.

In the action game, a plurality of operation target candidate game characters may be selected from among a plurality of game characters belonging to the main character group, based on the skill information describing the game skill level of a user. In this case, skill information is information based on, for example, a past score achieved by a user or the number of opponent characters defeated by a user in the past.

The invention claimed is:

1. A game device for carrying out a game of a sport match between a first team operated by a user and a second team, comprising:
    participating player selecting means for selecting a plurality of player characters to participate in the match from among a plurality of player characters belonging to the first team;
    operation target candidate player selecting means for selecting a plurality of player characters as operation target candidates from among the plurality of player characters selected by the participating player selecting means, based on an operation by the user, the operation target candidates being a concurrently selected subset of the participating player characters;
    operation target player switching means for switching, in the match, a user's operation target among the plurality of player characters selected by the operation target candidate player selecting means; and
    operation target player control means for causing, in the match, a player character which is the user's operation target to act, based on an operation by the user.

2. The game device according to claim 1, further comprising operation target candidate showing means for showing the plurality of player characters selected by the operation target candidate player selecting means in a game screen displayed in the match.

3. The game device according to claim 1, wherein
    the operation target candidate player selecting means includes selection encouraging means for encouraging the user to select a plurality of player characters from among the plurality of player characters selected by the participating player selecting means, and
    the operation target candidate player selecting means selects, as the operation target candidates, the plurality of player characters selected by the user from among the plurality of player characters selected by the participating player selecting means.

4. The game device according to claim 1, further comprising:
  setting encouraging means for encouraging the user to set action control information concerning action control for player characters belonging to the first team; and
  teammate player control means for causing, in the match, a player character which is not the user's operation target, among the plurality of player characters selected by the participating player selecting means, to act based on the action control information,
  wherein
  the operation target candidate player selecting means selects a plurality of player characters as the operation target candidates from among the plurality of player characters selected by the participating player selecting means, based on the action control information.

5. The game device according to claim 4, further comprising:
  selection control information storage means for storing selection control information concerning selection of the operation target candidates so as to be correlated to a condition concerning the action control information,
  wherein
  the operation target candidate player selecting means selects a plurality of player characters as the operation target candidates from among the plurality of player characters selected by the participating player selecting means, based on the selection control information correlated to the condition which is satisfied by the action control information.

6. The game device according to claim 1, further comprising:
  setting means for setting action control information concerning action control of player characters belonging to the second team; and
  opponent player control means for causing, in the match, a player character belonging to the second team and participating in the match to act, based on the action control information,
  wherein
  the operation target candidate player selecting means selects a plurality of player characters as the operation target candidates from among the plurality of player characters selected by the participating player selecting means, based on the action control information.

7. The game device according to claim 6, further comprising:
  selection control information storage means for storing selection control information concerning selection of the operation target candidates so as to be correlated to a condition concerning the action control information,
  wherein
  the operation target candidate player selecting means selects a plurality of player characters as the operation target candidates from among the plurality of player characters selected by the participating player selecting means, based on the selection control information correlated to the condition which is satisfied by the action control information.

8. The game device according to claim 1, further comprising
  skill information obtaining means for obtaining skill information concerning a game skill level of the user,
  wherein
  the operation target candidate player selecting means selects a plurality of player characters as the operation target candidates from among the plurality of player characters selected by the participating player selecting means, based on the skill information.

9. The game device according to claim 8, further comprising:
  selection control information storage means for storing selection control information concerning selection of the operation target candidates so as to be correlated to a condition concerning the skill information,
  wherein
  the operation target candidate player selecting means selects a plurality of player characters as the operation target candidates from among the plurality of player characters selected by the participating player selecting means, based on the selection control information correlated to the condition which is satisfied by the skill information.

10. The game device according to claim 1, wherein the operation target candidates are selected before beginning of the game or during a pause in the game.

11. A control method for controlling a game device for carrying out a game of a sport match between a first team operated by a user and a second team, the control method comprising:
  selecting a plurality of player characters to participate as participating player characters in the match from among a plurality of player characters belonging to the first team;
  selecting, by a processor, a plurality of player characters as operation target candidates from among the participating player characters, based on an operation by the user, the operation target candidates being a concurrently selected subset of the participating player characters;
  switching by the processor, in the match, a user's operation target among the plurality of player characters selected as the operation target candidates; and
  causing, in the match, a player character which is the user's operation target to act, based on an operation by the user.

12. The method according to claim 11, wherein the operation target candidates are selected before beginning of the game or during a pause in the game.

13. A computer readable information storage medium storing a program for causing a computer to function as a game device for carrying out a game of a match of sport between a first team operated by a user and a second team, the program for causing the computer to perform the method comprising:
  selecting a plurality of player characters to participate as participating player characters in the match from among a plurality of player characters belonging to the first team;
  selecting a plurality of player characters as operation target candidates from among the participating player characters, based on an operation by the user, the operation target candidates being a concurrently selected subset of the participating player characters;
  switching, in the match, a user's operation target among the plurality of player characters selected as the operation target candidates; and
  causing, in the match, a player character which is the user's operation target to act, based on an operation by the user.

14. The computer readable medium according to claim 13, wherein the operation target candidates are selected before beginning of the game or during a pause in the game.

15. A game device for carrying out a game of a sport match between a first team operated by a user and a second team, comprising:
a processor configured to:
- select a plurality of player characters to participate in the game from among a plurality of player characters belonging to the first team;
- select a plurality of player characters as operation target candidates from among the plurality of player characters, based on an operation by the user, the operation target candidates being a concurrently selected subset of players from the participating player characters;
- switch, in the game, a user's operation target among the plurality of player characters selected as the operation target candidates; and
- cause, in the game, a player character which is the user's operation target to act, based on an operation by the user.

16. The game device according to claim 15, wherein the operation target candidates are selected before beginning of the game or during a pause in the game.

* * * * *